United States Patent [19]

Behnke et al.

[11] 4,120,914

[45] Oct. 17, 1978

[54] AROMATIC POLYAMIDE FIBER BLEND FOR PROTECTIVE CLOTHING

[75] Inventors: Wallace Peery Behnke, Newark; Robert Stuart Chapin; John Francis Fierro, both of Wilmington, all of Del.

[73] Assignee: E. I. Du Pont de Nemours and Company, Wilmington, Del.

[21] Appl. No.: 765,751

[22] Filed: Feb. 4, 1977

[51] Int. Cl.$^2$ .............................................. C08L 77/10
[52] U.S. Cl. .......................... 260/857 TW; 260/45.7 P
[58] Field of Search .......... 260/857 TW, 78 S, 45.7 P

[56] References Cited

U.S. PATENT DOCUMENTS

| B 378,760 | 3/1976 | Economy et al. .................... 428/224 |
| 3,817,941 | 6/1974 | Bair et al. .......................... 260/78 R |
| 3,869,429 | 3/1975 | Blades ................................ 260/78 S |
| 3,869,430 | 3/1975 | Blades ................................ 260/78 R |

FOREIGN PATENT DOCUMENTS 2,286,218  4/1976  France.
1,438,067  6/1976  United Kingdom.

OTHER PUBLICATIONS

Man Made Textile Encyclopedia, pp. 548–549.

*Primary Examiner*—Theodore E. Pertilla

[57] ABSTRACT

An intimate blend of aromatic polyamide staple fiber components comprising 45–55 weight percent poly(m-phenylene isophthalamide) fibers and 45–55 weight percent poly(p-phenylene terephthalamide) fibers whose stress-strain curve exhibits no yield point.

5 Claims, 1 Drawing Figure

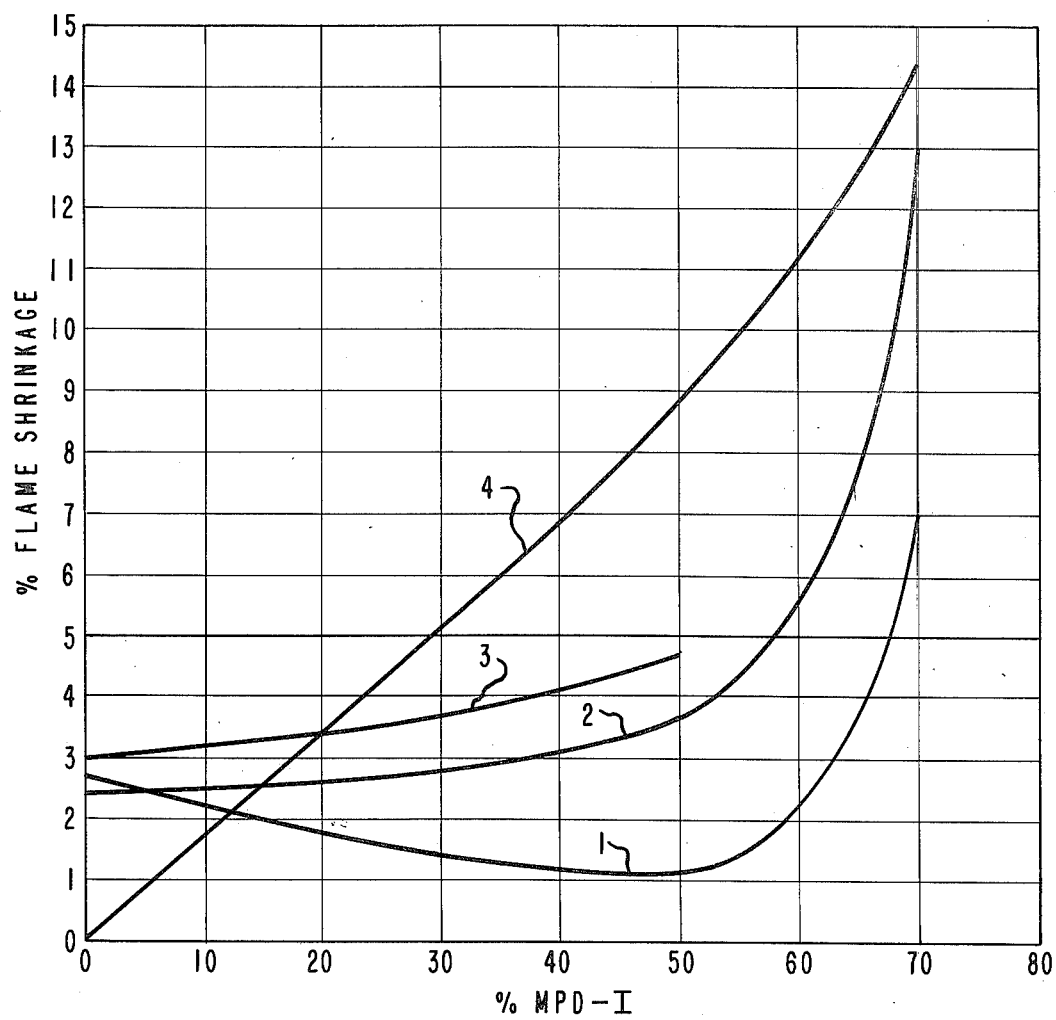

AROMATIC POLYAMIDE FIBER BLEND FOR PROTECTIVE CLOTHING

This invention relates to an intimate blend of aromatic polyamide staple fiber components comprising about 50% by weight of a poly(m-phenylene isophthalamide) staple component and about 50% by weight of a poly(p-phenylene terephthalamide) staple component which has a stress-strain curve exhibiting no yield point. In fabric form the blend provides good resistance to shrinkage at high temperature while maintaining the desirable aesthetic properties of the poly(m-phenylene isophthalamide) fibers.

BACKGROUND OF THE INVENTION

Aromatic polyamide fibers are known to be useful in the preparation of high temperature resistant protective clothing. Poly(m-phenylene isophthalamide) fibers have been found to be particularly desirable since they provide fabrics having good aesthetic properties. The wearing of such protective clothing is thus made less burdensome and the needed protection is provided against a perhaps unlikely exposure to high temperature. However, fabrics comprised of 100% by weight poly(m-phenylene isophthalamide) fibers do not provide the needed protection against extreme temperature conditions such as that provided by exposure to burning fuel. Under such exposure, fabrics of 100% by weight poly(m-phenylene isophthalamide) fibers break open, thus exposing the wearer's skin to the flame. Satisfactory resistance to such fabric break-open is provided by an intimate blend of 3-20% by weight of poly(p-phenylene terephthalamide) fibers with poly(m-phenylene isophthalamide) fibers. Although this fabric provides adequate resistance to break-open, the fabric shrinks so much on total immersion of the wearer in flames that the fabric is drawn down snugly against the wearer's skin, thereby expelling the insulating air layer otherwise present. This allows conductive heat transfer so that the wearer sustains more severe burns than would occur with the layer of insulating air present. In order to avoid loss of the insulating air layer, a fabric of about 4 to 5 oz./yd.$^2$ should shrink no more than 5% under the conditions of exposure. Military specifications require such a shrinkage limitation. The most preferred fabric weight is 4.5 oz./yd.$^2$.

Synthetic organic fibers are known which are inherently non-flammable and in fabric form shrink less than 5% on exposure to conditions simulating burning fuel. For example, a cured novolac resin fiber "Kynol" and poly(p-phenylene terephthalamide) fibers are such low shrinkage fibers. However, fabrics prepared exclusively from such fibers are not fully satisfactory because of poor fabric aesthetics and other problems.

Blends of high shrinkage and low shrinkage fibers are known to provide high fabric shrinkage even when only small amounts of high shrinkage fiber are present. For example, it can be seen from FIG. 3, page 549 of *Man-Made Textile Encyclopedia*, that as few as 20% high shrinkage fibers provides a fabric having very high overall shrinkage. Thus it would not be expected that an intimate blend of high shrinkage and low shrinkage fibers containing a relatively large amount of high shrinkage fibers could be used to prepare a low shrinkage fabric.

This invention provides an intimate blend of aromatic polyamide staple fiber components which in fabric form have desirable aesthetic properties and an overall fabric shrinkage of 5% or less when exposed to conditions simulating burning fuel.

DESCRIPTION OF THE INVENTION

This invention provides an intimate blend of aromatic polyamide staple fiber components comprising 45-55 weight percent poly(m-phenylene isophthalamide) fibers and 45-55 weight percent poly(p-phenylene terephthalamide) fibers whose stress-strain curve exhibits no yield point. Preferably the poly(m-phenylene isophthalamide) fibers are substantially amorphous. It is further preferred that at least one of the component fibers contains an amount of phosphorus-containing flame retardant sufficient to provide at least 0.8% by weight phosphorus in the blend. Preferably the poly(m-phenylene isophthalamide) fibers contain the phosphorus-containing flame retardant. Preferably both fiber components are dyed.

The FIGURE shows a plot of flame shrinkage against blend composition as shown in the examples.

DETAILED DESCRIPTION OF THE INVENTION

Fibers of poly(p-phenylene terephthalamide) may be prepared with widely varying degrees of molecular orientation, and accordingly exhibit a spectrum of tensile and textile properties corresponding to the varying molecular orientation. For purposes of the present invention, it is necessary to employ poly(p-phenylene terephthalamide) fibers with highly developed molecular orientation, e.g. as described in U.S. Pat. Nos. 3,869,429, 3,869,430 or 3,817,941. Although these fibers, when highly crimped, suffer mechanical damage often resulting in an appreciable decrease in fiber tenacity, the crimped fibers are fully useful in the present invention since extremely high tenacity does not appear to be required. The highly crimped fibers are more dyeable than the fibers before crimping. Suitable poly(p-phenylene terephthalamide) fibers are defined to be those whose stress-strain curve exhibits no yield point, i.e. a force-elongation curve (conventional Instron Test at 10% elongation per minute) whose second derivative is never negative. Such stress-strain behavior is characteristic of poly(p-phenylene terephthalamide) fibers with high degrees of molecular orientation such as those provided by the above mentioned patents. Poly(p-phenylene terephthalamide) fibers which have more modest and normal degrees of molecular orientation are not suitable for use in the present invention. Crimped poly(p-phenylene terephthalamide) fibers having high degrees of molecular orientation continue to exhibit such behavior even though the stress-strain curve may terminate "early" in view of a low break elongation caused by mechanical damage during crimping.

The optimum blend composition of the present invention comprises approximately equal proportions by weight of the two specified aromatic polyamide staple components. It is known that fabric flame shrinkage of 100% by weight poly(p-phenylene terephthalamide) staple fibers is very low, i.e. less than 5% maximum shrinkage. As pointed out previously, such fabrics have poor aesthetic properties, e.g. they are quite stiff. Surprisingly, when "no yield point" poly(p-phenylene terephthalamide) staple fibers are employed, it has now been discovered that blends containing up to approximately equal quantities by weight of poly(m-phenylene isophthalamide) staple fibers yield fabrics which still exhibit low flame shrinkage. The fabric flame shrinkage thus appears to be relatively insensitive to blend composition up to approximately 50% by weight poly(m-phenylene isophthalamide) staple fibers. However, when the proportion of poly(m-phenylene isophthalamide) staple fibers is increased substantially beyond 50% by weight, e.g. to 65 or 70% by weight, the fabric flame shrinkage increases abruptly above 5% (not acceptable). Although proportions of poly(m-phenylene isophthalamide) staple fibers substantially below 50% by weight do yield fabrics with low flame shrinkage, they are not preferred for the following reasons:

(1) fabric aesthetics improve with increasing poly(m-phenylene isophthalamide) fiber component;

(2) the ease of spinning yarns from staple blends increases with increasing weight percentages of poly(m-phenylene isophthalamide) fiber component;

(3) blends containing approximately 50% by weight poly(m-phenylene isophthalamide) fibers provide an optimum combination of good resistance to fabric break-open and resistance to erosion in that molten metal pouring over the fabric for a 2-3 second exposure carbonizes and removes fiber, thus reducing fabric thickness. The improved performance may be due to the tendency of poly(m-phenylene isophthalamide) fibers to foam under such conditions.

(4) in preferred blends having a phosphorus content of at least 0.8% by weight phosphorus for low after flame times, the desired phosphorus content is most easily reached by using the poly(m-phenylene isophthalamide) fiber component as the phosphorus carrier. The amount of phosphorus containing material which can be introduced into aromatic polyamide fibers is limited and greater amounts can be put into poly(m-phenylene isophthalamide) fibers than in poly(p-phenylene terephthalamide) fibers.

DEFINITIONS AND TESTS

Staple fiber means short fiber segments, e.g. 1-10 inches of ordinary textile denier, e.g. 1-10 denier per filament fibers.

Aromatic polyamide means a manufactured fiber in which the fiber substance is a long-chain synthetic polyamide in which at least 85% of the amide linkages are attached directly to two aromatic rings.

Intimate blend means a statistically random mixture of the staple fiber components in the form of a bale, web, sliver, yarn, fabric, etc.

Poly(m-phenylene isophthalamide) component means an aromatic polyamide staple fiber wherein the polymer is poly(m-phenylene isophthalamide) or copolymers thereof and wherein the aromatic rings may optionally bear substituents, e.g., halogen atoms or sulfonate groups. The fibers are preferably drawn but substantially uncrystallized, although crystalline fibers are also operable. The fibers may contain various additives, e.g., dyes, pigments, ultraviolet light screeners, delusterants, etc. A preferred additive is a phosphorus-containing flame retardant, e.g., a tetrakis(hydroxymethyl)phosphonium compound cross-linked with a reactive resin, and present throughout the fiber in micro-dispersed form, e.g., as disclosed in British Pat. No. 1,438,067.

Poly(p-phenylene terephthalamide) component means an aromatic polyamide staple fiber wherein the polymer is poly(p-phenylene terephthalamide) or copolymers thereof, and wherein the organic rings may optionally bear substituents, e.g., halogen atoms. The fibers may contain various additives, e.g., dyes, pigments, ultraviolet light screeners, delusterants, etc.

Determination of Thermal Shrinkage (linear)

Samples used to determine linear shrinkage measure 4 inches by 4 inches. Lines are marked on each sample ½ inch from each edge perpendicular to the direction in which shrinkage is to be measured.

The sample is mounted on a 6 inch by 6 inch stainless steel plate having a 3.5 inch by 3.5 inch opening in the center. The plate has two pins or hooks 2.5 inch apart fixed to one side of the plate centered on a line parallel to one edge of the plate opening and 0.25 inch into the opening. A second set of hooks, also 2.5 inch apart is attached to a 10 gm weight attached to a wire leader and thread. The sample is mounted by inserting the hooks of the mounting plate through the sample along one of the marked lines so that the sample is centered over the opening in the mounting plate. The other set of hooks is inserted through the marked line near the opposite edge of the sample giving a sample length of 3.0 inches. If the sample has a face and back (one side calendered) the face side will be towards the flame. Three specimens are tested.

The mounted sample is positioned over a 4 inch square shuttered opening such that the center of the closed shutter plate is directly beneath the center point of the mounted sample. The weight is attached to the hooks on the free edge and the supporting thread and weight placed over a pulley to provide constant tension to the sample during exposure.

A Meker burner is placed at the center and below the shutter plate such that the top of the burner is 1.8 inches below the plane of the mounted sample. The flame of the Meker burner is adjusted to obtain a heat flux of approximately 1.8 cal/cm$^2$/sec at the height of 1.8 inches above the burner top. The heat flux may be measured with a HYCAL calorimeter (0–10 MV, 0–12 BTU/ft$^2$/sec).

With the shutter closed, the mounting plate holding the sample is placed over the exposure opening. The thread connecting the weight to the edge hooks is draped over the pulley allowing the weight to hang free. The sample is exposed to the test source for 6 ± 0.2 seconds by using a suitable shutter and timing device. After removal of the sample from test plate, the distance between the marked lines at the center of the sample is measured, using precision calipers to the nearest 0.02 inch. No attempt should be made to flatten or otherwise straighten the exposed sample prior to measurement.

Shrinkage results are calculated as $(Lo - Ls/Lo) \times 100 =$ Percent Linear shrinkage
Lo = Original sample length (3 inches)
Ls = Sample length after exposure
The results are averaged for the samples tested.

EXAMPLE 1

A quantity of 1.5 dpf poly(p-phenylene terephthalamide) (PPD-T) tow having very high molecular orientation is crimped to approximately 6–8 crimps per inch and cut to 1.5 inch staple. This PPD-T staple, characterized by stress-strain strain curves exhibiting no yield point, is formed into intimate blends by cocarding with appropriate proportions of drawn, uncrystallized poly(m-phenylene isophthalamide) (MPD-I) staple 1.5 dpf, 1.5 inch cut length and crimped to 11 crimps per inch (cpi).

The blended fibers are spun to two ply yarns 40/2 c.c., 22Z/15.5S which are processed into plain weave fabrics of the indicated construction (Table I). The fabrics are each finished by scouring, and calendering at 500° F. at 40 tons pressure. The flame shrinkage of these fabrics is determined to be as indicated.

TABLE I

| FABRIC | PPD-T/MPD-I* | BASIS WT. | CONSTRUCTION** | FLAME SHRINKAGE |
|---|---|---|---|---|
| 55-2 | 100/0 | 3.8 oz/yd$^2$ | 62 × 47 | 2.7% |
| 50-2 | 50/50 | 4.0 | 62 × 49 | 0.6, 1.5*** |
| 52-2 | 30/70 | 4.0 | 63 × 49 | 7, 7.7*** |

*Parts by weight
**Ends per inch, warp × fill
***Same fabric, shrinkage determined on two separate occasions.

Low flame shrinkage, i.e., less than 5%, is maintained at least up to 50% MPD-I in the blend, but increases to unacceptable levels when the proportion of MPD-I substantially exceeds 50% (e.g., 70%). The results are shown graphically as curve 1 of the FIGURE. Stiffness for these fabrics, as measured by bending length (Government Standards CCCT-191B Test 5206) decreases from an unacceptable 3.8 cm (warp) × 3.6 cm (fill) to a tolerable 2.7 × 2.6 on increasing the percent MPD-I from 0% to 50%. (By employing preferred fabric finishing techniques, the bending length for the 50/50 blend fabrics may be further decreased to a fully acceptable 2.4 cm average).

Use of substantially amorphous fibers for the MPD-I staple component in the 50/50 blend is preferred for preparing appropriate weight protective garments (e.g. 10 oz./yd$^2$) for steel industry workers in view of its greater foaming, thickening and charring (and therefore maximum thermal protection) on exposure to splashed molten metal.

EXAMPLE 2

In order to provide protective garments suitable for military use, a colored (e.g., sage green) fabric is required. A tow of 1.5 dpf PPD-T fibers having a high degree of molecular orientation is soaked in water to thoroughly wet out the tow which is next passed through a steam stuffer-box crimper to provide 12 cpi in the wet tow. After crimping, the tow is maintained wet (at least 15% water based on fiber). A portion of this wet crimped tow is dyed to a sage green color with cationic dyes in an aqueous bath heated to 250° F. (closed vessel) for 2 hours to produce Sample 2A. A second portion is dyed sage green employing acetophenone as a carrier (35 g/l, same temperature and time as Sample 2A) to produce Sample 2B. These samples are cut to 1.5 inch staple. Both Samples 2A and 2B are characterized by stress-strain curves exhibiting no yield point.

A sample of sage green MPD-I staple containing 1.64% phosphorus (afterflame suppressant) is prepared by feeding a never-dried tow of 1.5 dpf MPD-I fibers (see e.g., British Pat. No. 1,438,067, Example 1, first part, for "stock tow" preparation) at a rate of 100 parts by weight per minute (dry fiber basis) through a tank into which is simultaneously fed an aqueous treatment solution comprising 32 parts per minute tetrakis(hydroxymethyl)-phosphonium oxalate (American Cyanamid's Pyroset TKS), 7.9 parts per minute melamine-formaldehyde condensate (Monsanto's Resloom HP), 1.3 parts per minute cationic sage green dye formulation, plus sufficient makeup water to maintain liquid level in the tank constant. The impregnated tow exits the tank via a pair of fixed nip squeeze rolls, and passes through a drying/curing oven where it is heated to 100° C. for 1.5 hours residence time. The tow is subsequently washed in water (10:1, bath:fiber) at 75-80° C., crimped, and cut to 1.5 inches staple.

Appropriate proportions of these aromatic polyamide staple components are blended and spun into yarns as in Example 1, and woven into fabrics as indicated in Table II. These fabrics are boiled off 15 minutes in clear water and dried prior to testing.

TABLE II

| FABRIC | PPD-T/MPD-I* | BASIS WT. | CONSTRUCTION** | FLAME SHRINKAGE |
|---|---|---|---|---|
| SL26290 | 100(1)/0 | 4.3 oz/yd$^2$ | 80 × 50 | 2.9% |
| SL26292 | 50(1)/50 | 4.5 | 78 × 48 | 4.7 |
| SL26291 | 100(2)/0 | 4.4 | 77 × 45 | 2.3 |
| SL26293 | 50(2)/50 | 4.4 | 78 × 48 | 3.6 |
| SL26294 | 35(2)/65 | 4.4 | 79 × 44 | 12.8 |

*Parts by weight
**Ends per inch, warp × fill
(1) Sample 2B
(2) Sample 2A

Fabrics 26291, 26293 and 26294 are plotted as curve 2 in the FIGURE. Fabrics 26290 and 26292 are plotted as curve 3 in the FIGURE.

The blends containing up to about 50% of the MPD-I staple component (but not those as high as 65%) continue to exhibit desirable low flame shrinkage. The afterflame times, i.e., the interval during which the fabric is observed to continue to flame after removal of the ignition source, for the 50/50 blend fabrics are less than 3 seconds (acceptable).

Flame shrinkage data for additional fabric samples prepared from aromatic polyamide staple components as in Examples 1 and 2 (undyed, dyed by various techniques, various crimp frequencies, etc.) indicate that the shrinkage is relatively insensitive (desirable) to fabric construction variables, e.g., plain weave, twills (2 × 1, 3 × 1, 3 × 1 "left handed "), and to fabric finishing conditions, at least within reasonable and common ranges for these parameters.

EXAMPLE 3

A. For Comparison purposes, fabrics are prepared from aromatic polyamide staple fiber componenets where, however, the PPD-T component exhibits a yield point in its stress-strain curve, i.e., has a lower "more normal" degree of molecular orientation, and consequently more normal textile fiber properties. These PPD-T staple fibers (1.3 dpf and 1½ inch long) are prepared as disclosed in British Pat. No. 1,438,067, Example 2, and contain 1.09% by weight imbibed phosphorus as flame retardant. These fibers are blended with amorphous MPD-I staple (which has been dyed to a tan color), spun into yarns as in Example 1, and woven into 3 × 1 twill fabrics, which are finished by scouring, calendering at 500° F. at 40 tons pressure, and then autoclaved.

TABLE III

| FABRIC | PPD-T*/MPD-I | BASIS WT. | CONSTRUCTION** | FLAME SHRINKAGE |
| --- | --- | --- | --- | --- |
| 56-1L | 100/0 | 4.8 oz/yd² | 91 × 47 | 0% |
| 65-1L | 50/50 | 5.2 | 92 × 49 | 8.8 |
| 64-1L | 30/70 | 5.2 | 96 × 48 | 14.5 |

*PPD-T component has yield point in stress-strain curve
**Ends per inch, warp × fill.

The results are plotted as curve 4 in the FIGURE.

Note that in spite of the fact that this "textile-type" PPD-T component by itself will provide a fabric with essentially zero flame shrinkage, when blended at the 50/50 level with the MPD-I component, the shrinkage — unlike the blends of the present invention — is unacceptably high (and becomes even higher at the 30/70 blend level). Not only are such 50/50 blends unacceptably high in flame shrinkage, but by examining similar fabrics, it has been established that flame shrinkage is (undesirably) quite sensitive to both fabric construction and finishing conditions for blends of such components.

B. In another comparison experiment, a 50/50 blend is prepared from 2 dpf, 1 ⅜ inch cured novalac resin fibers ("Kynol") and the MPD-I staple of Example 1. Although fabrics of 100° "Kynol" have very low flame shrinkage (approximately 3%), this 50/50 blend (3 × 1 twill, 5.2 oz/yd², fabric 61-1L) shrinks an unacceptable 13.2%. Additional data for similar fabrics from these components indicate that for such blends shrinkage is (undesirably) relatively strongly dependent on fabric construction and finishing conditions.

We claim:

1. An intimate blend of aromatic polyamide staple fiber components comprising 45–55 weight percent poly(m-phenylene isophthalamide) fibers and 45–55 weight percent poly(p-phenylene terephthalamide) fibers whose stress-strain curve exhibits no yield point.

2. The blend of claim 1 wherein the poly(m-phenylene isophthalamide) fibers are amorphous.

3. The blend of claim 1 wherein at least one of the component fibers contains an amount of phosphorus-containing flame retardant to provide at least 0.8% by weight phosphorus in the blend.

4. The blend of claim 1 wherein the poly(m-phenylene isophthalamide) fibers contain phosphorus-containing flame retardant.

5. The blend of claim 1 wherein the component fibers are dyed.

* * * * *